No. 649,636. Patented May 15, 1900.
H. GOTHAN.
APPARATUS FOR DETERMINING DIRECTION OF GRADIENTS OF STRATIFIED MASSES.
(Application filed May 1, 1899.)
(No Model.) 2 Sheets—Sheet 1.
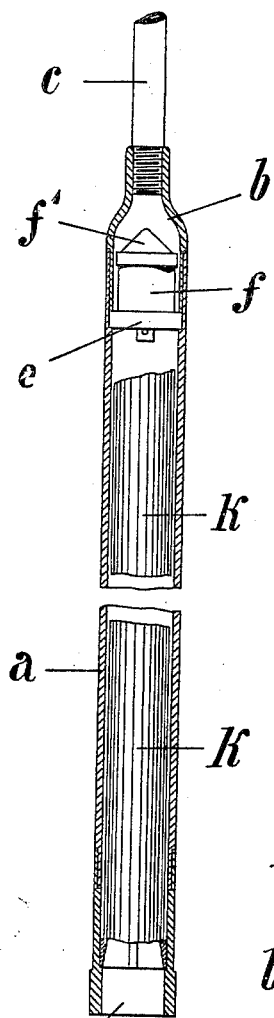
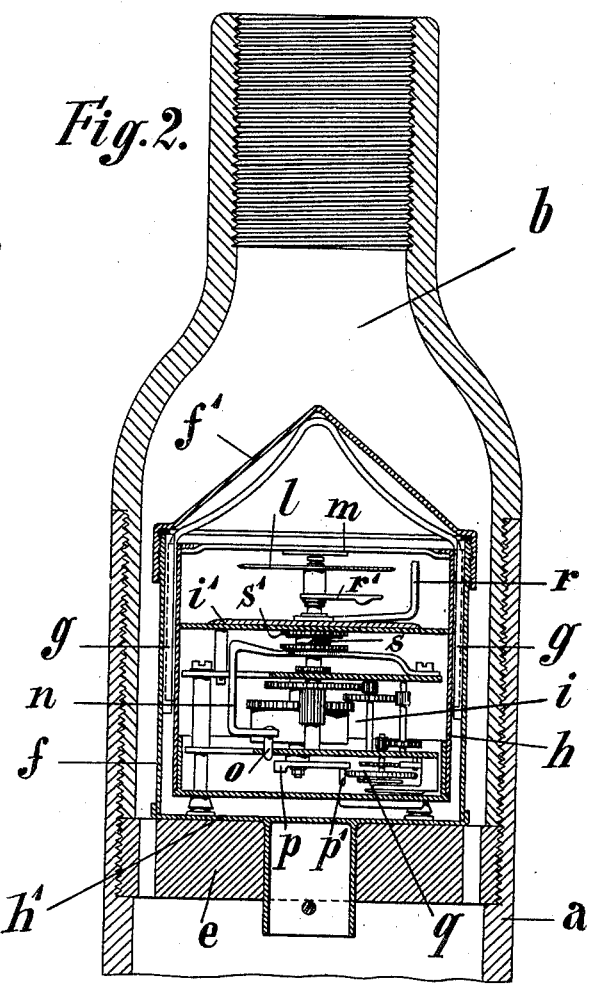
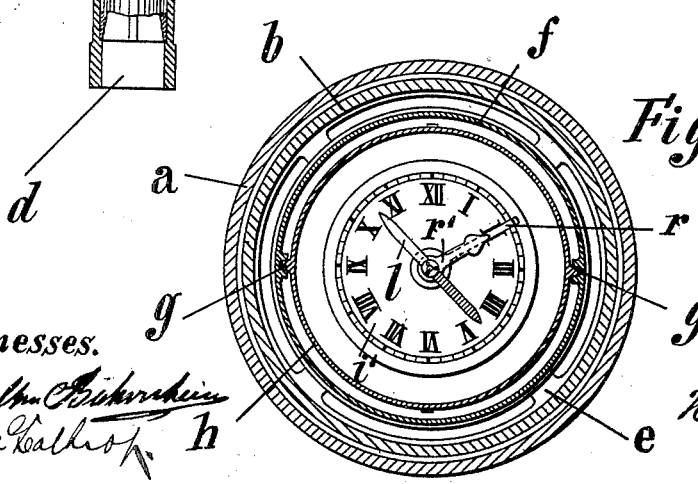
Witnesses. Inventor.
THE NORRIS PETERS CO., PHOTO-LITHO., WASHINGTON, D. C.

No. 649,636. Patented May 15, 1900.
H. GOTHAN.
APPARATUS FOR DETERMINING DIRECTION OF GRADIENTS OF STRATIFIED MASSES.
(Application filed May 1, 1899.)
(No Model.) 2 Sheets—Sheet 2.
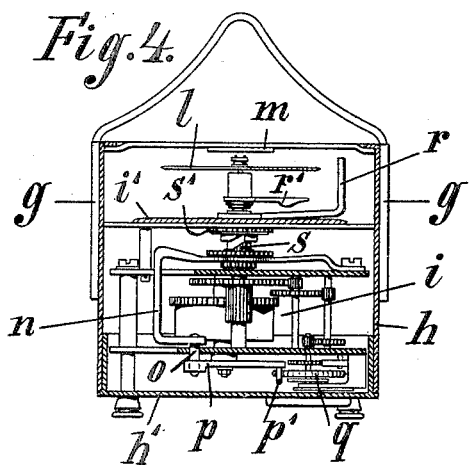
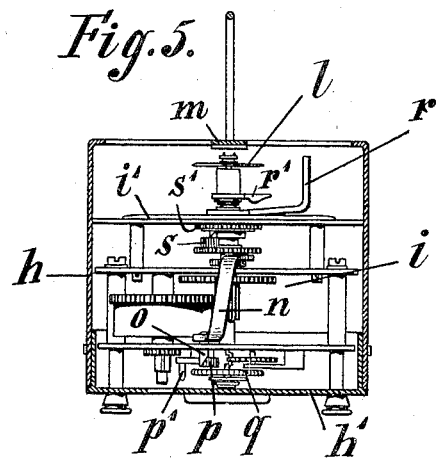
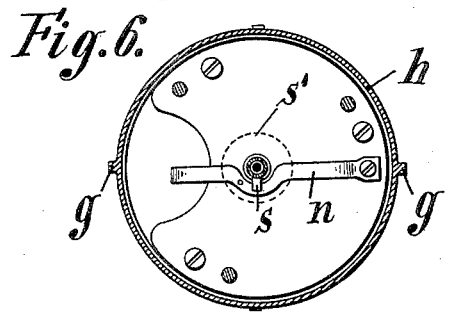
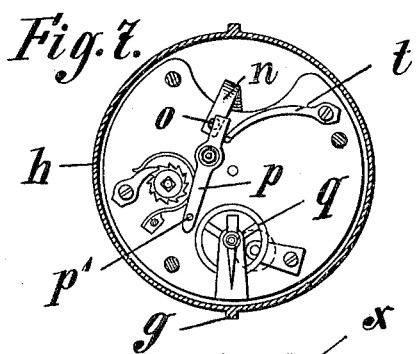
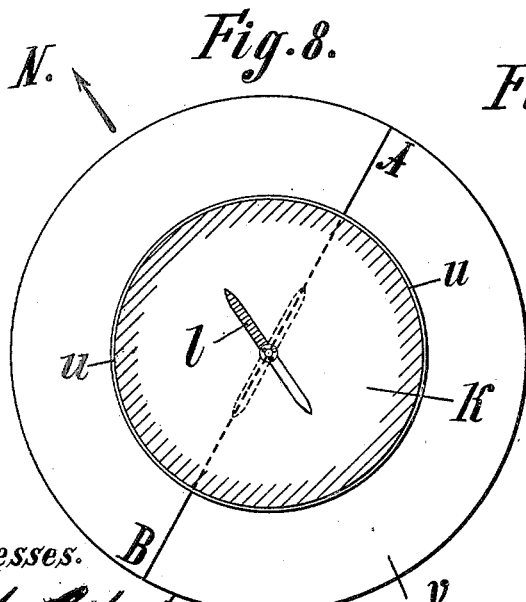
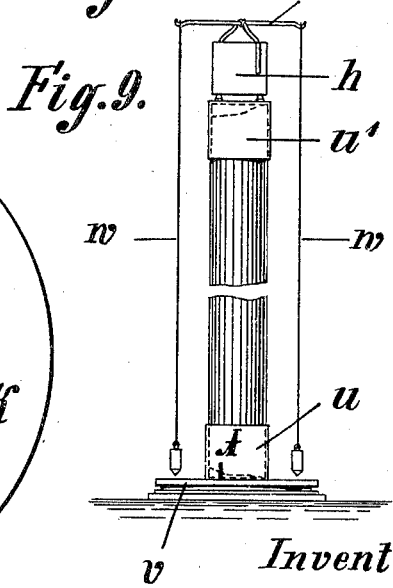
Witnesses.
Inventor.

UNITED STATES PATENT OFFICE.

HERMANN GOTHAN, OF GOSLAR, GERMANY.

APPARATUS FOR DETERMINING DIRECTION OF GRADIENTS OF STRATIFIED MASSES.

SPECIFICATION forming part of Letters Patent No. 649,636, dated May 15, 1900.

Application filed May 1, 1899. Serial No. 715,189. (No model.)

*To all whom it may concern:*

Be it known that I, HERMANN GOTHAN, restaurant-keeper, a citizen of Germany, residing at Goslar-on-the-Harz, in the Province of Hanover and Kingdom of Prussia, Germany, have invented certain new and useful Improvements in or Relating to Apparatus for the Purpose of Determining the Direction of Gradients of Stratified Masses; and I do declare the following to be a full, clear, and exact description of the invention, such as will enable others skilled in the art to which it appertains to make and use the same.

My invention relates to improvements in apparatus for easily and accurately ascertaining the direction of gradients, &c., of stratified masses, in which apparatus is used a freely-oscillating magnetic needle within a surrounded space inclosed by non-magnetic material and which can be fixed in position at a predetermined moment by means of any mechanical device; and the objects of my improvement are, first, to strongly fix the boring-cylinder to the core to be drawn up to the surface; second, to break off the core after having secured the boring-cylinder to it and fixed the magnetic needle which is arranged in the upper part of said cylinder; third, to provide the lower edge of the boring-cylinder with marks, and, fourth, to use a revoluble disk bearing a straight line and being in combination with sockets that are also provided with indicating-marks. I attain these objects by the mechanism illustrated in the accompanying drawings, in which—

Figure 1 is a cross-section of part of a boring-cylinder. Fig. 2 is a cross-section, on a larger scale, of the head of a cylinder with the apparatus out of action. Fig. 3 is a plan view of the apparatus. Figs. 4 and 5 are cross-sections of the apparatus when set for action. Figs. 6 and 7 show a plan and under side view of Figs. 4 and 5, respectively; and Figs. 8 and 9 represent the device for use in finally ascertaining the position of the body to be examined.

The boring-cylinder $a$, consisting of several parts screwed together, the head $b$ of the boring-cylinder, and the first connecting-rod $c$ are made of a non-magnetic material. The end of the boring-cylinder is provided with the usual boring-crown provided with the usual core-retainer for the core $k$. For the purpose of holding and fixing the magnetic needle and comparing its relative position a clockwork mechanism is made use of, in this case serving as an example. The clockwork mechanism is contained in a casing which is fastened to a plate $e$, fixed to the boring-cylinder $a$ and close up to the protecting-head $b$, also screwed into or connected to the boring-cylinder. In this casing is set, by means of guides or ribs $g$, Figs. 2 and 3, the clock-case proper, $h$, so as not to be movable, to which case the bottom plate $h'$, carrying the clockwork mechanism $i$, is fastened by means of a bayonet or other connection. The clockwork $i$ is similar to that of an ordinary alarm-clock, but without the sounding device or minute-hand, and is provided with a spring-hand. The setting-hand $r$ can be set as required, as in the case of alarm-clocks. On the upper end of the minute-wheel shaft oscillates freely a magnetic needle $l$, which can by suitable means be suddenly lifted and securely held against a bar $m$ on the inner side of the clock-case $h$. For this purpose the magnetic needle may be provided with small pin-like projections, and the bar covered with a layer of paper, leather, or material with which the pins may engage. The holding device for the magnetic needle consists of a spring $n$, Figs. 2 and 4 to 7, which is fastened at the upper part of the mechanism and provided at its lower end with a conical pin $o$. The pin $o$ rests against a conical projection or end of a lever $p$, thereby keeping that lever and its pin $p'$ out of engagement with the balance $q$ of the clockwork, Figs. 5 and 7. The hand $r$ being set at any desired number, Figs. 2 to 5, on the dial $i'$—say on the number "1," Fig. 3—the spring $n$, and with it the lower hand $r'$, will move upward the moment the projection $s$, Figs. 4 and 5, enters a corresponding recess in the setting-disk connected to the hand $r'$. The magnetic needle $l$ is thereby pressed against the bar $m$ and held securely, Fig. 2. At the same moment the conical pin $o$ is freed from the contact with the lever $p$, and the pin $p'$ is pressed by means of the spring $t$ against the balance $q$, Fig. 7, thus stopping at the same moment the action of the clockwork mechanism. The clockwork thus stopped and the magnetic needle fixed in the position it occupied at that moment, pointing due north, as shown by the hatched needle in Fig. 7, the core, pinched in the boring-cylinder by means of the usual core-retainer, is broken off, and then in strong connection with said cylinder drawn up to the surface.

The apparatus is used in the following manner: At the lower edge of the boring-cylinder there are two marks opposite to each other, say marks A and B, Fig. 8. The core that has been drawn up with and inside the cylinder with a line corresponding to the above marks A B, Fig. 8, and then placed, contained, as it is, in the cylinder, in a socket, Fig. 9, also provided with marks exactly corresponding with the marks A and B of the cylinder, so that the marks correspond on the cylinder with the marks on the socket. The socket, with the cylinder and cone inside, is now placed perpendicularly on a horizontally-revoluble disk $v$, Figs. 8 and 9, also marked with a straight line A B, the socket being so placed on it that the marks A B of the socket exactly correspond with the line marked A B on the disk. The connecting part $b$ of the boring-cylinder is next taken off, as well as the cover $f'$ of the clockwork-casing, thereby exposing to view the time-dial and the magnetic needle. By means of plumbs $w$ the direction of the fixed magnetic needle is ascertained, the points indicated on the disk by the plumbs joined by a straight line, and the N pole indicated by the needle marked therein. The different parts of the cylinder are now unscrewed until the cone is exposed, with the several strata exhibited in their true relative position to the pole N. The clockwork is now set on the case and so arranged that the still stationary magnetic needle is again placed in a vertical plane through the line determined by means of the plumbs. The magnetic needle is now free to oscillate by turning back the hand $r$. The needle will now seek the true north pole and stop oscillating. Now the core, together with the clock mechanism on it, is turned by means of the revoluble disk on which it stands until the N pole of the magnetic needle again comes over the number on the dial over which it was found when brought to the surface—i. e., where it was fixed at the bottom of the boring. The position of the core so fixed as regards the N pole is the same as that it occupied originally in the earth. In case the lowest portion of the core is to be examined, which is still contained in the crown of the boring-cylinder and held by the core-retainer, the core is drawn out upward, care being taken to keep the line marked on the core in the direction A B, and then placed, as before, on the line A B and the operation carried on as before.

Having now particularly described and ascertained the nature of my said invention and in what manner the same is to be performed, I declare that what I claim is—

1. An apparatus for the purpose of determining the direction of gradients, &c., of stratified masses, which apparatus consists of a boring-cylinder which is usually provided with an oscillating magnetic needle and a clockwork to fix the same at a predetermined moment; of a horizontally-revoluble disk and of two plumbs and two sockets that are both in combination with said disk, substantially as described.

2. In apparatus for the purpose of determining the direction of gradients, &c., of stratified masses a boring-cylinder $b$, $a$, $d$ which is provided at its lower edge with two marks A and B in combination with a horizontally-revoluble disk provided with a corresponding straight marking-line A B, sockets $u$ and $u'$ also provided with indicating-marks and plumbs $w$ for the purpose of comparing the marked boring-cylinder, the core and the magnetic needle in relation to the scale-disk, substantially as described.

HERMANN GOTHAN.

Witnesses:
WILHELM BICHONHEIM,
KIRKE LATHROP.